(12) United States Patent
Kingsley et al.

(10) Patent No.: US 7,669,589 B2
(45) Date of Patent: Mar. 2, 2010

(54) TRACK DRIVE ADJUSTMENT FOR A CONCRETE SAW

(75) Inventors: Michael Kingsley, Wellsville, KS (US); Douglas Dempsey, Pleasant Hill, MO (US); Donald F. Meister, Overland Park, KS (US); Leif Persson, Livermore, CA (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 247 days.

(21) Appl. No.: 11/177,224

(22) Filed: Jul. 8, 2005

(65) Prior Publication Data

US 2006/0060179 A1    Mar. 23, 2006

Related U.S. Application Data

(60) Provisional application No. 60/586,771, filed on Jul. 9, 2004.

(51) Int. Cl.
 *B28D 1/04* (2006.01)
(52) U.S. Cl. .................... 125/13.01; 125/13.03
(58) Field of Classification Search ............. 125/13.01, 125/13.03; 451/236, 352; 83/490
See application file for complete search history.

(56) References Cited

U.S. PATENT DOCUMENTS

| | | | | |
|---|---|---|---|---|
| 2,934,327 | A | * | 4/1960 | Lewis .................... 299/39.3 |
| 3,291,532 | A | | 12/1966 | Hatcher |
| 3,747,981 | A | * | 7/1973 | Zuzelo .................... 299/39.3 |
| 4,664,645 | A | | 5/1987 | Muck et al. |
| 4,848,845 | A | | 7/1989 | Kennedy |
| 5,215,071 | A | * | 6/1993 | Mertes et al. ........... 125/13.01 |
| 5,429,420 | A | | 7/1995 | Johnson |
| 5,477,844 | A | | 12/1995 | Meister |
| 5,680,854 | A | | 10/1997 | Kingsley et al. |
| 5,724,956 | A | * | 3/1998 | Ketterhagen ........... 125/13.01 |
| 5,743,247 | A | | 4/1998 | Kingsley et al. |
| 5,809,985 | A | | 9/1998 | Kingsley et al. |
| 5,810,448 | A | | 9/1998 | Kingsley et al. |
| 6,318,353 | B1 | | 11/2001 | Edwards et al. |
| 6,470,874 | B1 | | 10/2002 | Mertes |
| 6,536,422 | B1 | | 3/2003 | Zuzelo et al. |

* cited by examiner

*Primary Examiner*—Dung Van Nguyen
(74) *Attorney, Agent, or Firm*—Novak Druce + Quigg LLP (57) ABSTRACT

A self propelled concrete saw compensates for blade cutting resistance, for example by adjusting a movable drive assembly. An actuator may be used to move the drive assembly, for example through the operation of a control switch by an operator.

48 Claims, 11 Drawing Sheets

TRACK DRIVE ADJUSTMENT FOR A CONCRETE SAW

CROSS REFERENCE TO RELATED APPLICATIONS

This application claims benefit of priority to U.S. Provisional Patent Application Ser. No. 60/586,771, filed Jul. 9, 2004.

BACKGROUND

1. Field

The present disclosure relates to equipment that can be self-propelled, for example concrete saws.

2. Related Art

In the concrete industry, large slabs of concrete are used to form road beds, building floors and other structures used for its strength and durability. Seams, grooves or other cuts in the concrete may be made in the slabs to form expansion joints, control stress cracks as the slabs cure or to form channels or openings in the slabs to accept other structures. Concrete saws are used to cut the seams, grooves or other openings, and such concrete saws are often very heavy and difficult to move along the concrete slab.

For large or heavy construction applications, heavy self-propelled saws or other large concrete saws are used. Examples of concrete saws and their construction and operation can be found in a number of patents, including U.S. Pat. No. 5,809,985, entitled "Self-Propelled Saw," U.S. Pat. No. 5,743,247, entitled "Method and Apparatus for Safe Operation of Self-Propelled Concrete Saw," U.S. Pat. No. 5,680,854, entitled "Self-Propelled Saw," U.S. Pat. No. 5,477,844, entitled "Slurry Recovery System for a Wet Cutting Saw," and U.S. Pat. No. 4,664,645 entitled "Blade Drive Shaft Assembly," all of which are incorporated herein by reference. During setup and operation of the saw, an operator walks behind the saw to control the direction, cutting speed, cutting depth and other operating conditions under which the saw operates. The saw includes one or more wheels allowing the saw to move along the concrete and a frame supported by the wheels on which is mounted a motor or other power supply for operating a saw blade and often for driving one or more wheels to move the saw along the concrete surface. One or more handles extend behind the saw about the level of an operator's hands to allow the operator to manually position the saw. Typically, the saw blade is in the front of the saw and handles extend behind the saw.

For a typical straight cut, the operator aligns the saw blade and often a cutting guide with the intended cutting path. The saw is maneuvered with the saw blade raised above the concrete until the blade and cutting guide are aligned with the cutting path. As the saw blade engages the concrete or other surface to be cut, the blade cuts into the concrete to the desired depth, such as the depth selected by the operator. At the desired depth, the drive wheels are engaged to propel the saw forward to cut the desired slot or groove, which typically follows a straight cut path.

Conventional self-propelled concrete saws have the cutting blade mounted on the left or right side of the machine, so that the saw blade is significantly offset from the center of the machine and supported by the frame of the saw. The drive wheels on the rear axle propel to machine by applying torque and rotation to the drive wheels. When the blade is cutting the work surface, the blade applies an opposite resisting force against the drive from the drive wheels, but the resisting force is off-center to the side of the frame center line. When the wheels propel the saw forward and the blade is down and cutting on the right side of the saw, the saw tends to veer to the right. When the blade is cutting on the left side of the saw, the saw tends to veer to the left.

To compensate for the blade cutting resistance force created by the saw blade, the operator can physically lean on the handle bars to correct for the changing direction away from the cut path. However, such manual correction is not practical for larger saws or where it may be difficult for the operator to maneuver the saw.

On conventional large concrete saws, the rear axle can be manually aligned to extend in a direction other than 90 degrees or perpendicular to the center line of the frame, or in other words the cut path. Re-aligning the rear axle to be other than perpendicular produces a non-parallel propeling force in an attempt to compensate for the blade cutting resistance force produced by the blade while cutting, with the intention of producing a net straight-line movement of the saw along the cut path.

Drive axle re-alignment involves the operator shutting off the saw and using wrenches to loosen the axle mounting bolts. The drive axle is manually adjusted to the desired angle and the mounting bolts re-secured. The saw is then operated with the hope that the adjustment in the drive axle moves the saw in the desired direction. If not, the operator can adjust the drive axle again until the saw moves in the desired direction. However, the amount of blade cutting resistance produced by the blade depends on the depth of cut, the size of the blade, cutting speed, blade age, the concrete hardness, blade configuration and the pavement slope, as well as other conditions. When one or more of those conditions change, the operator may have to stop and re-adjust the axle or try guiding the saw manually.

SUMMARY

One or more aspects of the apparatus and methods described herein permit a self propelled saw to compensate for blade cutting resistance force. One or more aspects of the apparatus and methods may also allow an operator to more easily adjust the drive direction for the saw to correct for the tendency of the saw to veer in one direction or another. They may also reduce or eliminate the need for an operator to manually steer the saw to compensate for changes in direction in which the saw is being propelled.

In one example of the apparatus and methods described herein, a self-propelled machine such as a concrete saw has a drive assembly for moving the saw in a desired direction. The drive assembly is preferably movable so that the direction of the motive force provided by the drive assembly can be changed, for example to counter a blade cutting resistance force that may be produced by a saw blade. In one example, the blade cutting resistance produced by the saw blade is off center relative to the saw, and the drive assembly is movable so that the direction in which the drive wheels would move the saw is in a direction to counter the blade cutting resistance force produced by the saw blade. The drive assembly may have a pair of drive wheels supported on an axle or other support so that the drive wheels in the pair have aligned axes, and the drive assembly may be moved so that the direction in which the axes of the drive wheels is changed, such as by a moving element.

In another example of the apparatus and methods described herein, the concrete saw may have a movable drive assembly with a frame, which supports a saw blade and the motor or other means for driving the saw blade. The drive assembly is movable relative to the frame so as to change the direction of the motive force provided by the drive assembly to counter a blade cutting resistance force applied to the frame, for example through the saw blade. In one example, the drive assembly includes a pair of drive wheels mounted to an axle and the axle is movable relative to the frame. A shift or moving element moves the axle relative to the frame. The moving element may be controlled by a switch, lever or other electrical, electro-mechanical or mechanical means.

In a further example of the apparatus and methods described herein, a concrete saw may have a movable drive assembly supporting a frame for the saw, which in turn supports a saw blade. An actuator moves the drive assembly relative to the frame to change the direction of a motive force provided to the frame by the drive assembly. The drive assembly may include an axle that can pivot relative to the frame. The actuator can be a linear actuator having one end coupled to the frame and another end coupled to the axle.

These and other examples are set forth more fully below in conjunction with drawings, a brief description of which follows.

DETAILED DESCRIPTION

The following specification taken in conjunction with the drawings sets forth the preferred embodiments of the present inventions in such a manner that any person skilled in the art can make and use the inventions. The embodiments of the inventions disclosed herein are the best modes contemplated for carrying out the inventions in a commercial environment, although it should be understood that various modifications can be accomplished within the parameters of the present inventions.

Apparatus and methods are described for equipment, for example concrete saws, that are self-propelled and have movable drive assemblies. The drive assembly can be moved to counter the effects of blade cutting resistance forces created in the saw blade during cutting. Movement of the drive assembly can be carried out using a moving element controlled by the operator, thereby making realignment easier for the operator.

Figure 1:
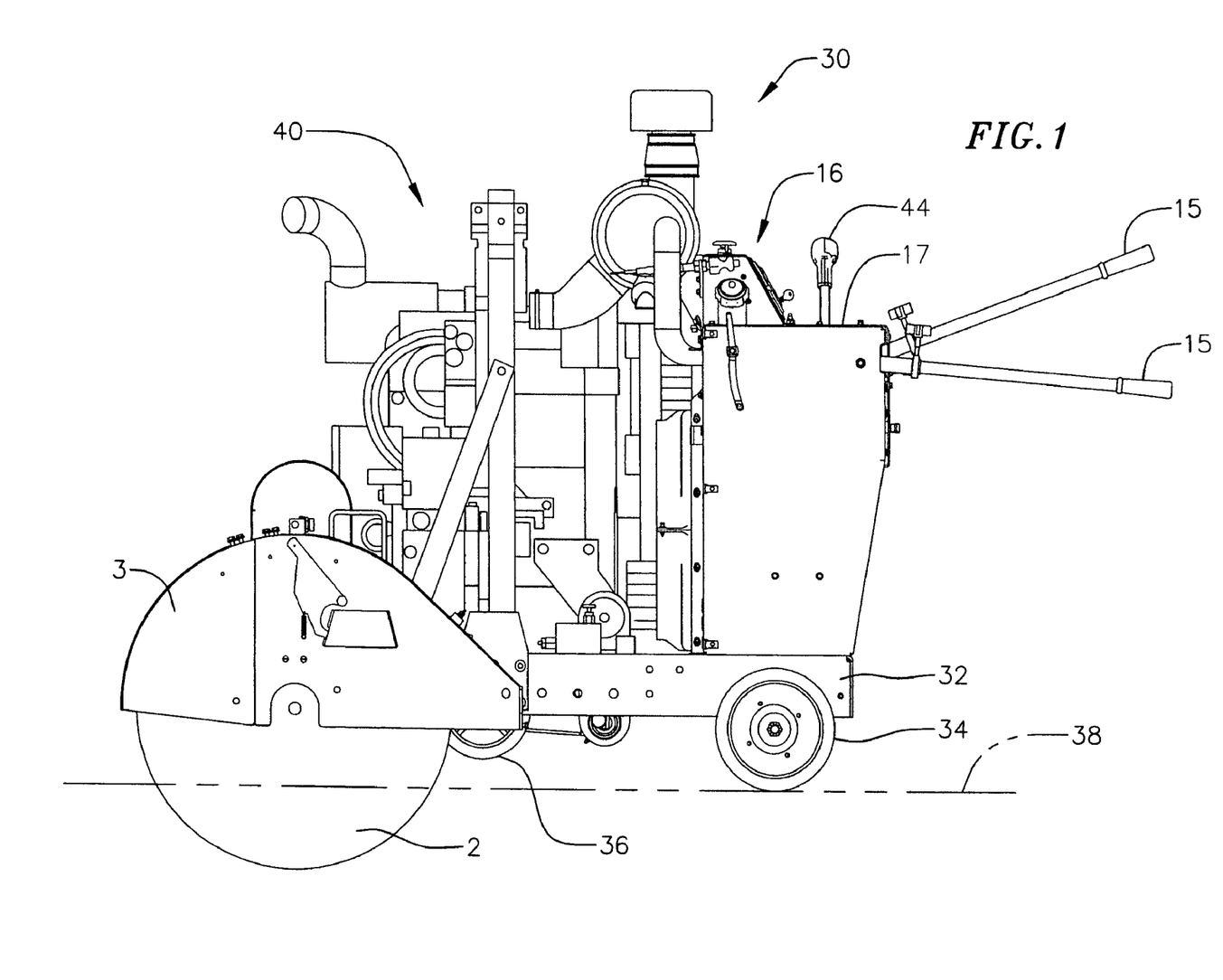
FIG. 1 is a left side elevation view of a self-propelled saw with which a movable drive assembly can be used.

In one example of a saw, a concrete saw 30 (FIGS. 1-3) includes a frame 32 supported by wheels 34 and 36. The wheels 34 and 36 allow the saw to move across a concrete surface 38 (FIG. 1). Details about the construction and configuration of a concrete saw are provided in the above-identified patents. An internal combustion engine 40 (FIG. 1) may be mounted to the frame 32 and may provide power both to rotate the saw blade 2 (FIG. 2) and to operate, through a transmission, the drive wheels 34 to propel the concrete saw. The engine 40 includes a crank shaft (not shown) which drives a blade drive element, for example through a gear box or a pulley around which is positioned a V-belt or other drive element for the saw blade, and drive means for driving the drive wheels 34, which drive means may include a V-belt for a transmission, or a drive mechanism or other means for driving the drive wheels.

Figures 2, 11:
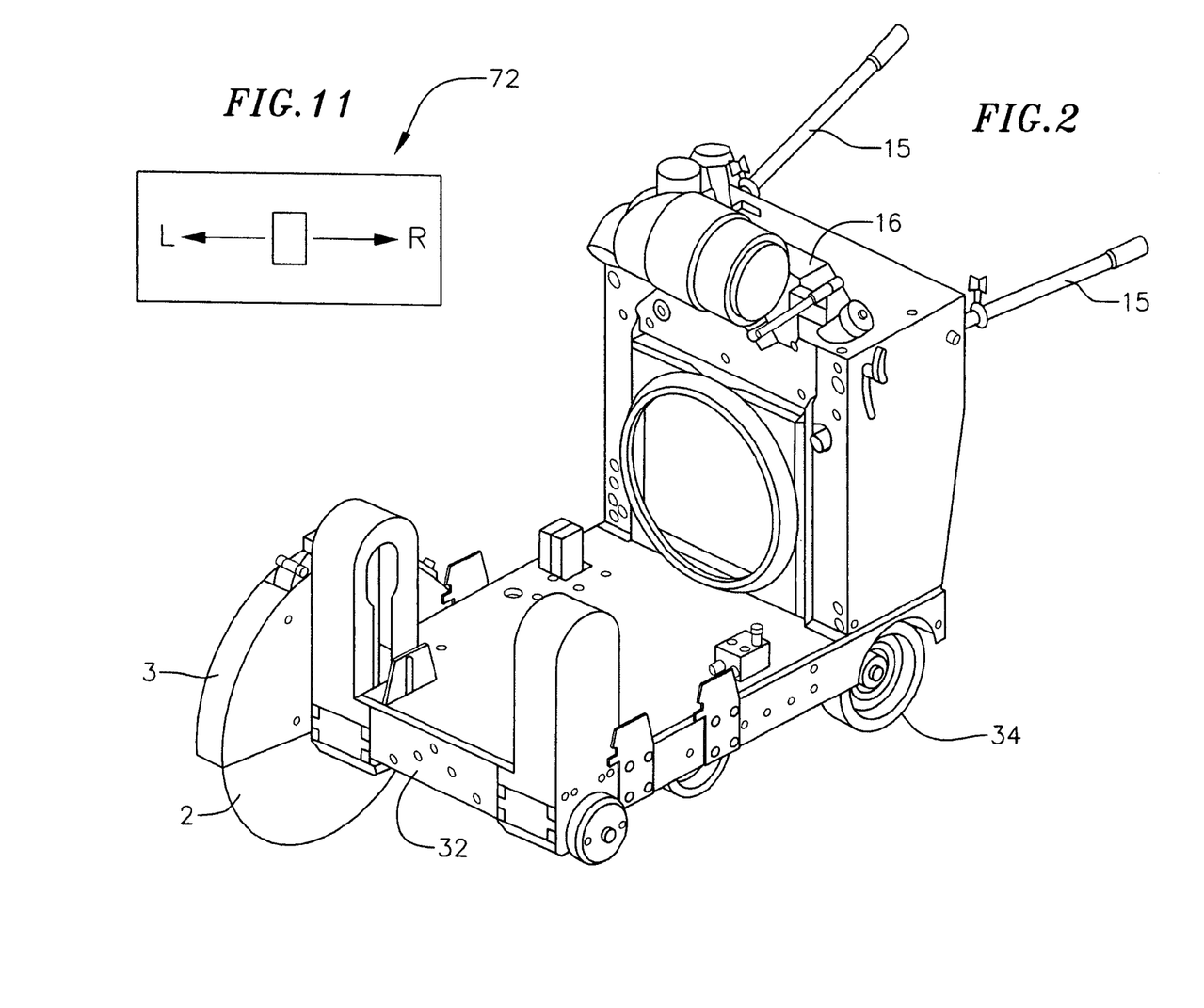
FIG. 2 is an upper left isometric view of the saw of FIG. 1 with the engine omitted.
FIG. 11 is a schematic diagram of a control arrangement for changing the drive direction of a concrete saw.
Figure 8:
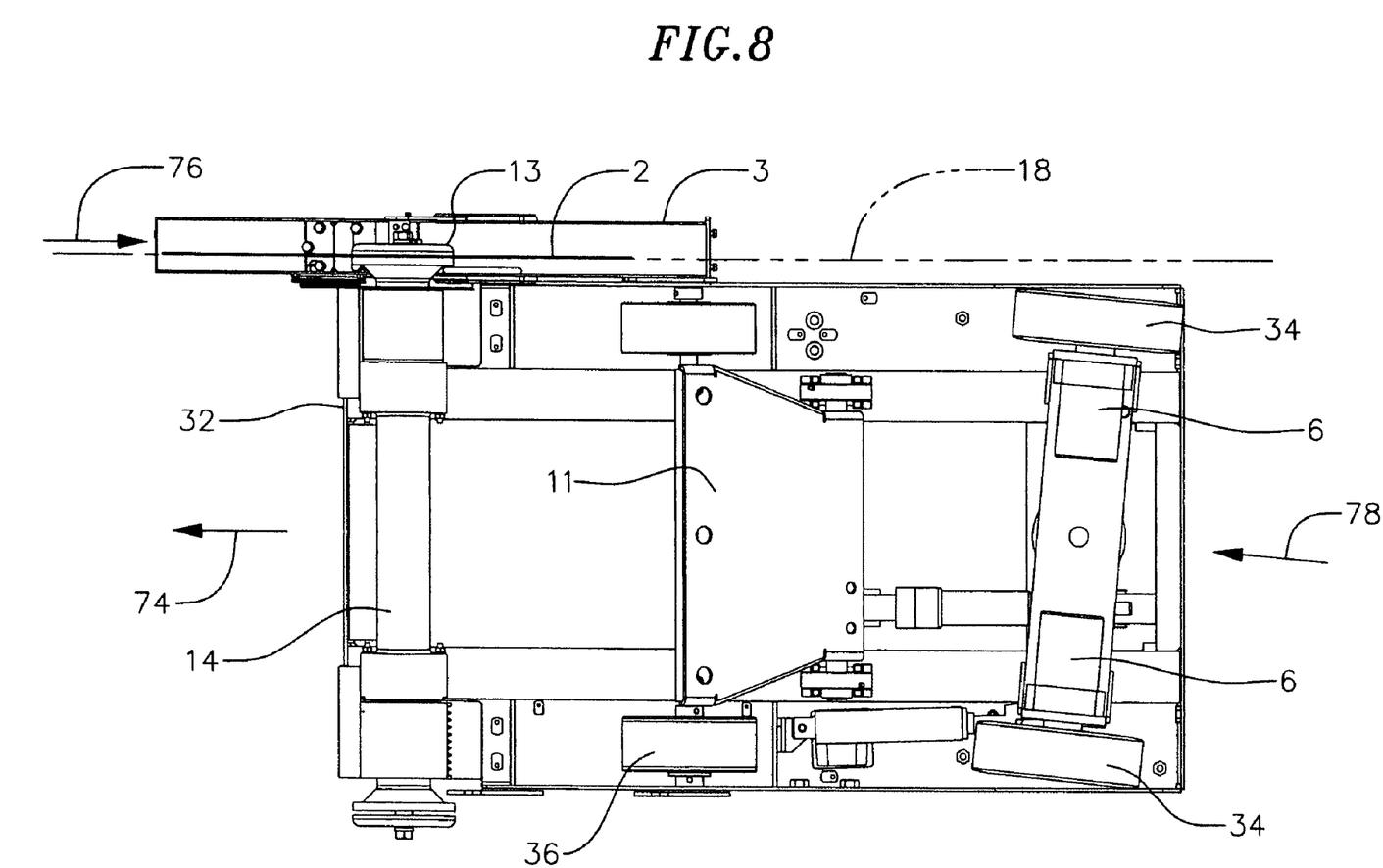
FIG. 8 is a bottom plan view of the saw of FIG. 1 having a saw blade mounted for a left-hand saw cut and with a linear actuator retracted to move the saw drive assembly.
Figure 9:
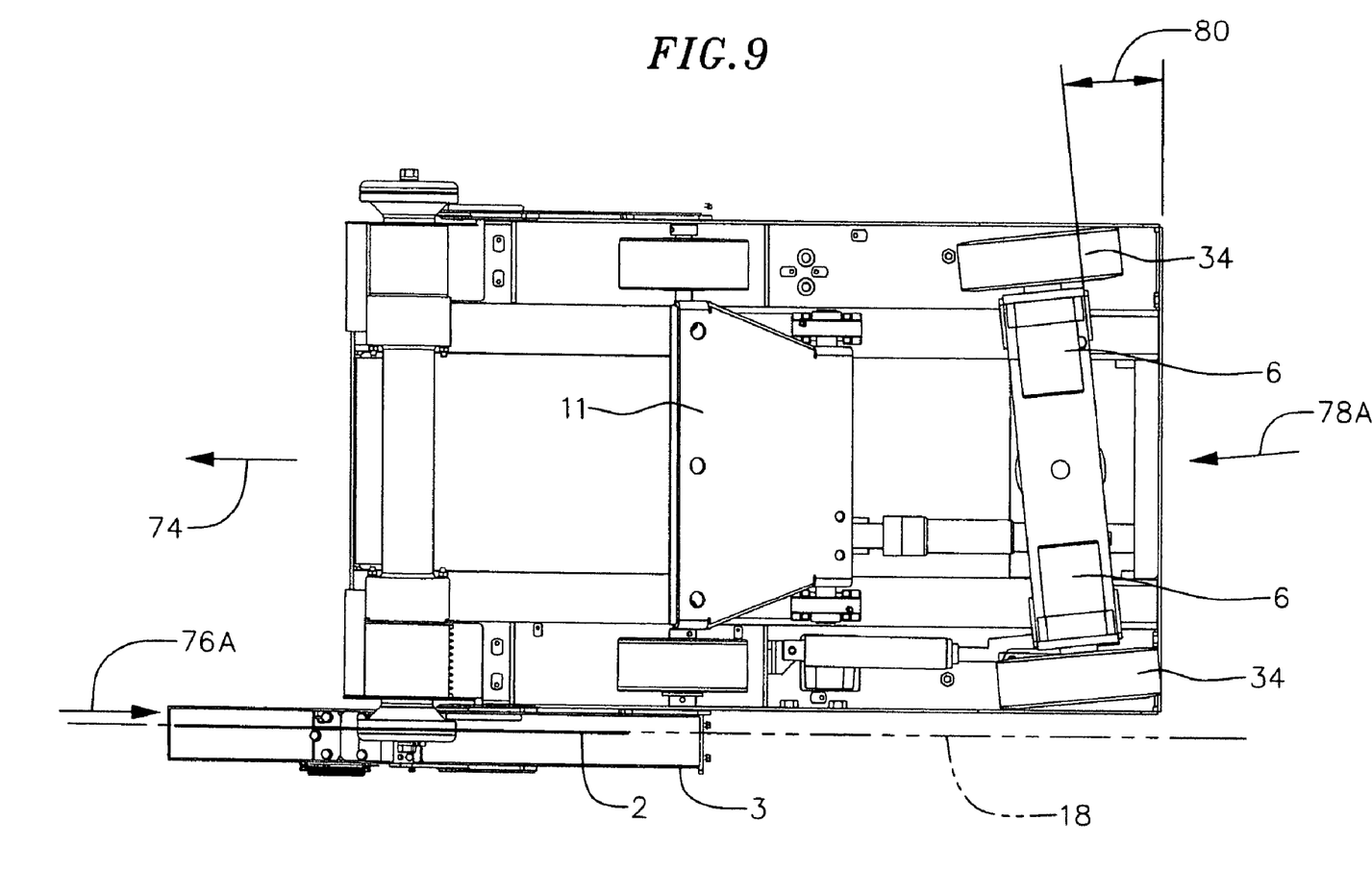
FIG. 9 is a bottom plan view of the saw of FIG. 1 having a saw blade mounted for a right-hand saw cut and with a linear actuator extended to move the saw drive assembly.

The saw blade 2 is mounted to a blade shaft 14 (FIG. 8) and is held in place through blade flanges such as at 13. The saw blade can be mounted on the blade shaft on the right side of the frame 32, as shown in FIGS. 2 and 9 for right hand saw cut, or on the left side of the frame 32, as shown in FIG. 8, for left-hand saw cut. Therefore, in the concrete saws shown in the drawings, the saw blade is mounted offset from the center line 42 (see FIG. 3) of the saw. The blade shaft is mounted to the frame 32, for example in the manner such as that shown in FIGS. 1-3 and 8-10. A blade guard 3 typically extends over at least the upper portion of the saw blade to help control debris and slurry spread that may be produced during cutting.

An operator (not shown) positions the saw using handles 15 (FIGS. 1 and 2) and can move the saw by operating the drive assembly to propel the saw forward. Movement of the saw through the drive wheels 34 can be controlled through a drive control 44 (FIG. 1) on a console 17. The drive wheels 34 are put in motion using power from suitable means, for example torque producing motors 6 (FIGS. 3-4 and 8-9), or other means for driving the wheels such as other mechanical, hydraulic or electrical drive means. The cutting speed or forward progress can be controlled in part by controlling the power applied to the drive wheels 34 through the motors or other means. The motors are controlled through the drive control 44 on the console 17. The operator also controls blade depth by suitable positioning of a hinged front axle assembly 11 (FIGS. 3-4 and 8-9), which may hydraulically raise and lower the front end of the saw. The front axle assembly 11 is supported on the concrete or other surface through the front wheels 36. The front axle assembly pivots downward away from, and upward toward, the saw frame 32 when a height adjustment cylinder extends and retracts, thereby raising and lowering the saw.

The operator can also control the cutting direction by moving a drive assembly to change the direction of motive force applied through the drive assembly to the frame and along the surface 38. The drive assembly can take any number of configurations, but in the configurations shown in FIGS. 3-4 and 8-9, the drive assembly includes driving wheels 34 supported for movement by the frame. In the example shown in FIGS. 1-10, the driving wheels are on a movable axle 46. In the example shown in FIGS. 12 and 13, the driving wheels are on respective support structures that are movable relative to the frame, and the support structure for one driving wheel is independent of the support structure for the other driving wheel. In both examples, the driving wheels are movable relative to the frame so as to change their direction of drive relative to the front-to-back direction of the frame. The driving wheels 34 can be driven through other means than motors 6, but the present discussion will have the motors 6 mounted under the axle 46 for driving the drive wheels 34. The movable axle includes a relatively flat upper plate and downwardly extending side portions at respective ends of the upper plate for supporting the motors 6 and the drive wheels. However, the movable axle can take a number of other configurations while still allowing movement of the drive assembly relative to the frame.

Figures 4, 4A:
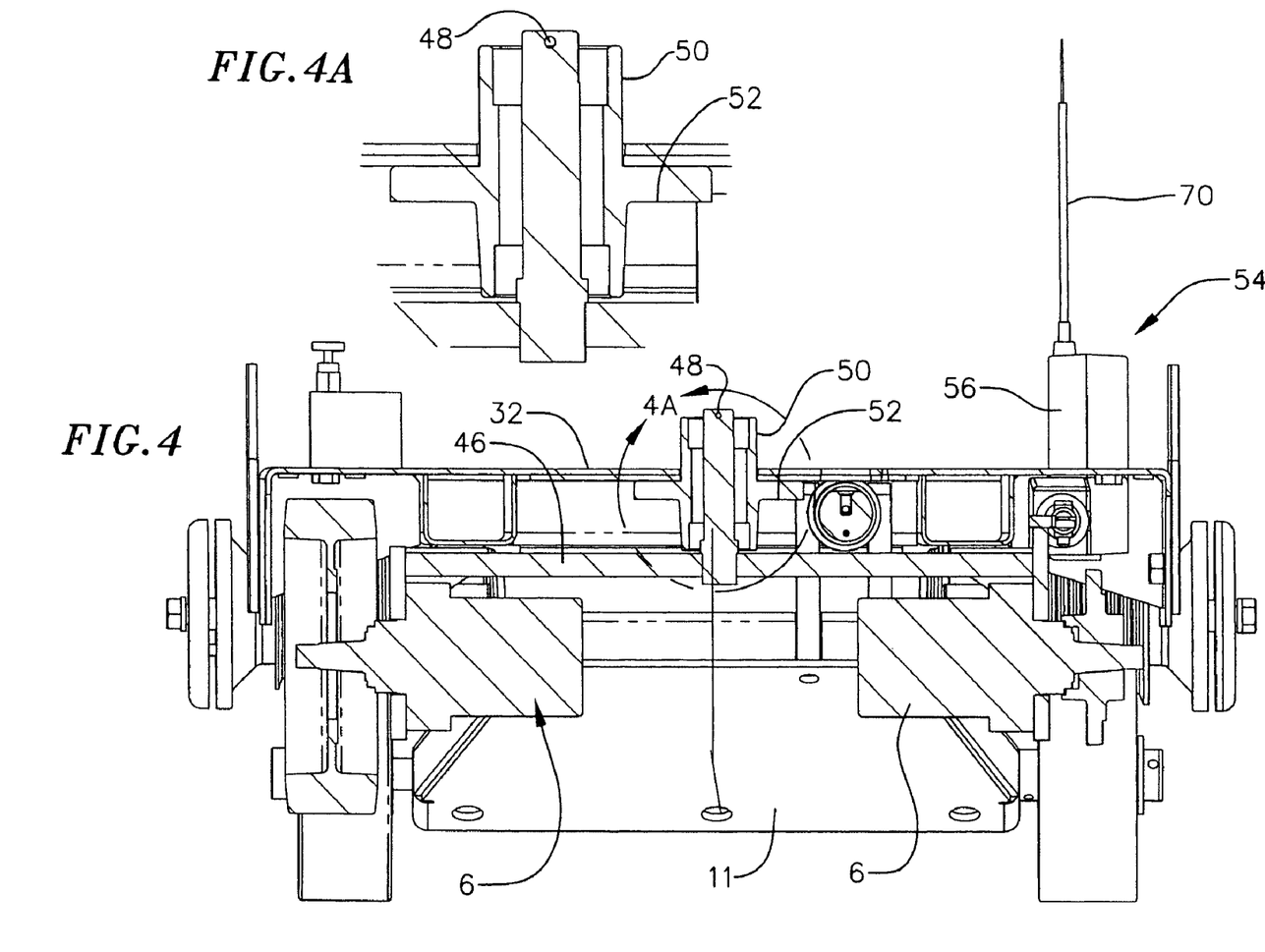
FIG. 4 is a transverse cross-section of a movable drive assembly taken along line 4-4 of FIG. 3.
FIG. 4A is a detailed transverse cross-section of a pivot assembly for the saw of FIG. 1.

The axle 46 is pivotally coupled to the frame 32 through a connection such as that provided by spindle 48 supported by a bearing, for example within a bearing housing 50 (FIG. 4). The axle 46, with the drive wheels 34, can pivot about the spindle 48. Pivoting of the axle with the drive wheels allows the direction of motive force produced through the drive wheels to be changed relative to the frame. The spindle 48 is preferably positioned with the bearing housing 50 on the center line 42 of the saw. The spindle 48 and the bearing housing 50 allow the drive assembly to be movable relative to the frame, thereby allowing changes to the direction of motive force produced through the drive wheels. The connection provided by the spindle 48 is a form of a swivel coupling, but other configurations can be used as well, for example bearing surfaces, low friction surfaces, or the like. The pivoting coupling of the axle relative to the frame can be located other than the center of the axle, or the center of the frame, as well. For example, the pivot point can be off-center, and can be closer to one drive wheel than to the other, and the pivot axis can be positioned above a wheel.

As shown in FIG. 4, the spindle 48 is formed from a shaft having a lower end fixed to the axle 46 and having an enlarged shoulder portion extending about the circumference of the spindle adjacent the upper surface of the axle 46. A smaller diameter portion of the spindle then extends within the remainder of the bearing housing 50. The bearing housing 50 is mounted to the frame 32 through a bearing flange 52. Other means for rotatably coupling the movable drive assembly with the frame can also be used.

The movable drive assembly is moved relative to the frame through a shift element or moving element for moving the drive assembly. The moving element is labeled generally as 54, and can take a number of configurations for moving the drive assembly as desired. In the example shown in the drawings, the moving element 54 includes a linear actuator 56. The linear actuator may be any suitable linear actuator for moving an end 58 of a rod 60 over a continuous linear distance or over a series of discrete linear distances to achieve the desired movement of the drive assembly. The moving element 54 may also be any other suitable moving device, linear or nonlinear, continuous or discrete increments, as desired, for achieving the desired movement of the drive assembly. For purposes of the present example, the linear actuator 56 will be described as a continuous range linear motion device for moving the drive assembly.

The moving element 54 may also be positioned on the opposite side of the frame 32 or elsewhere, including within the cowl of the saw to protect the moving element from slurry and other debris produced during operation of the saw. Suitable linkages can be provided between the end 58 of the rod 60 and the axle 46 to achieve the desired movement of the drive assembly with the actuator on the other side of the frame. For example, a rod or other element can be fixed to the axle 46 and extend upward through the frame 32 through an arcuate opening and thereafter coupled to the linear actuator for moving the drive assembly. Additionally, linkages between a moving element 54 and the drive assembly can be used other than that described herein.

Figure 7:
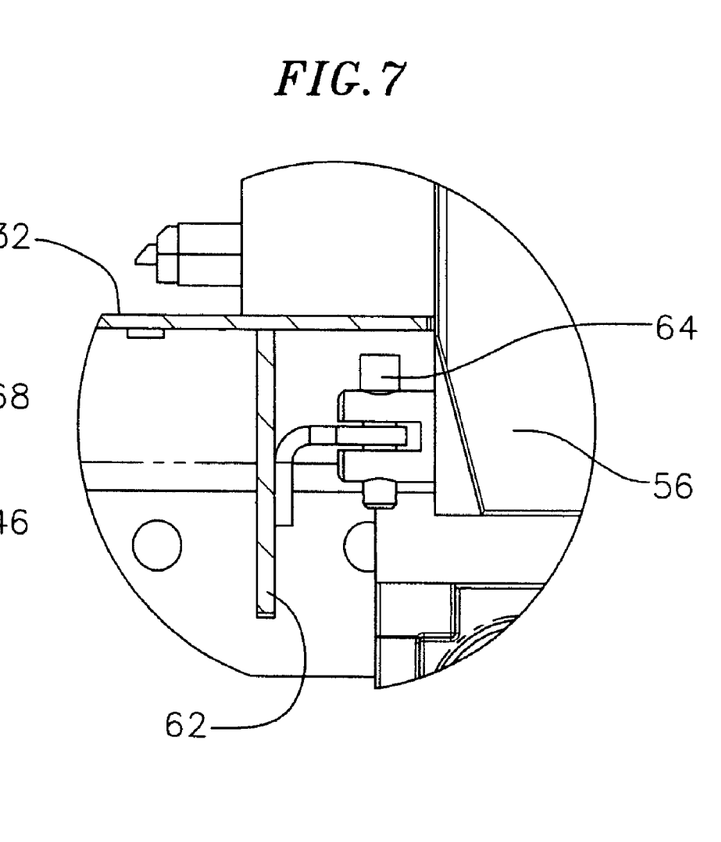
FIG. 7 is a detail of a mounting configuration for the linear actuator to the axle shown in FIG. 5.

The linear actuator 56 is mounted to the frame 32 through a suitable flange 62 (FIG. 7) extending from the frame 32. A pin 64 couples a mounting element on the linear actuator 56 to a complementary mounting element on the flange 62.

Figure 6:
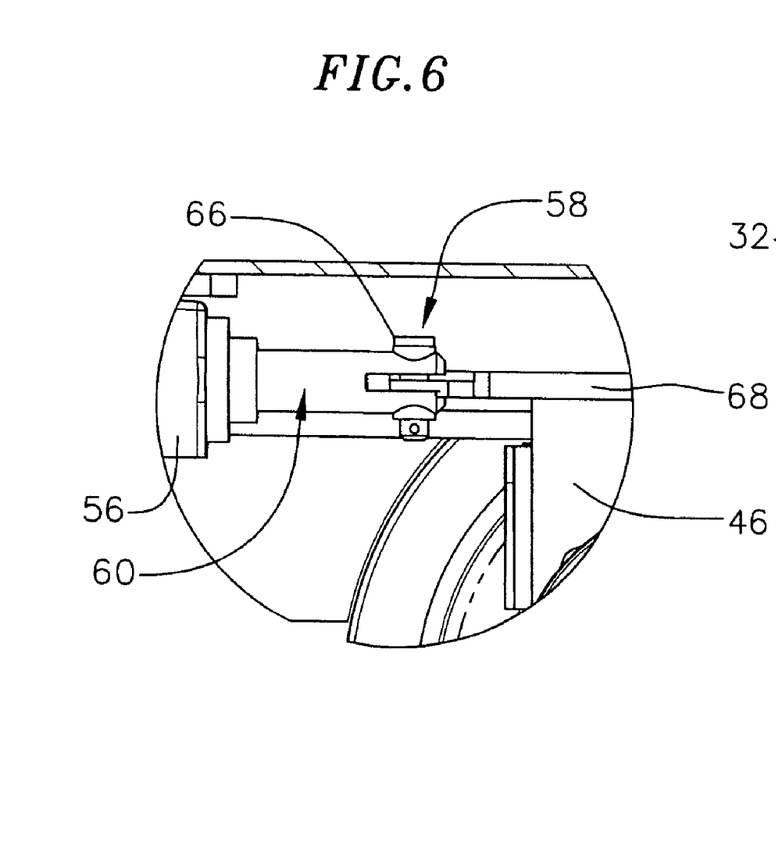
FIG. 6 is a detail of a mounting configuration for the linear actuator shown in FIG. 5.

The linear actuator 56 is coupled to the axle 46 (FIG. 6) using a pin 66 through a clevis on the end 58 of the rod 60 passing through an opening in a plate 68 fixed to the axle 46. The coupling between the rod 60 and the axle 46 permits normal movement between the two components while still allowing the linear actuator to reliably move the drive assembly as desired.

Figure 3:
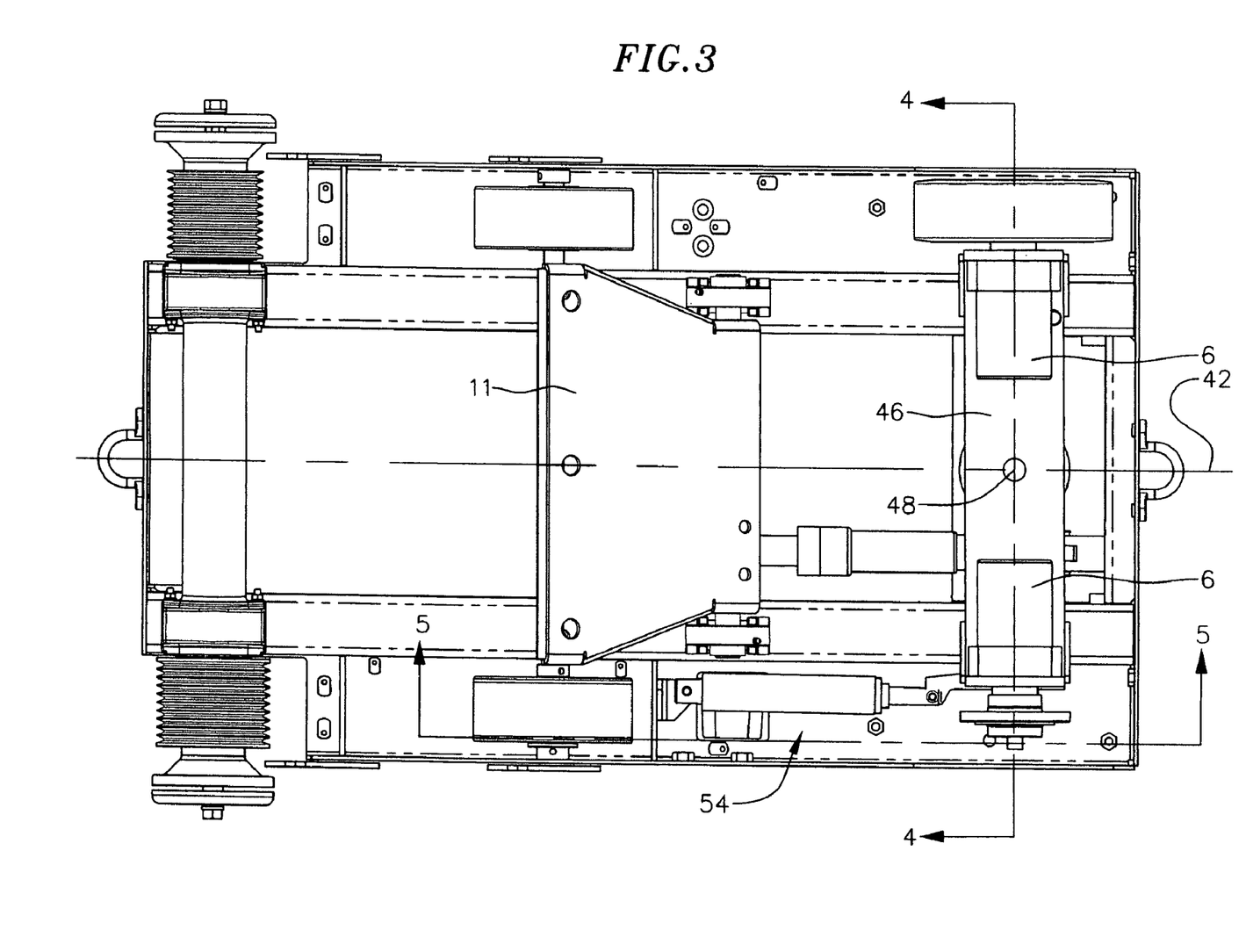
FIG. 3 is a bottom plan view of the saw of FIG. 1.

In the example shown in FIG. 3, the linear actuator is positioned under the frame 32 so as to have its piston moving approximately parallel to the center line 42 of the frame. The linear actuator is positioned on the saw in such a way that the linear actuator can move the drive assembly through the desired range of motion. As discussed more fully below, the linear actuator can move the axle through a significant angle both in the positive or clockwise direction and in the negative or counter clockwise direction relative to the precisely transverse position of the axle as viewed in FIG. 3. Therefore, the linear actuator is preferably configured and positioned so that the rod 60 can freely move the axle 46 through the desired range of angles relative to the frame. In one example, the actuator is an electro-mechanical linear actuator with an electric motor turning a threaded shaft or nut to effect a change in the length of the actuator. The moving element could also be a hydraulic cylinder, a manually turned or motor-driven screw feed, a rotary actuator, or the like. The moving element shown in the drawings, including a linear actuator and the examples of a manually turned screw feed, motor-driven screw feed, and rotary actuator, are examples of moving elements that operate independently of the other apparatus on the saw, including fasteners, holders, brackets and other structures that might lock or fix the axle and/or drive wheels in position relative to the frame. Therefore, the moving element can operate on the drive wheels without having to release or disconnect any fasteners, locks or other apparatus holding the drive wheels fixed or otherwise in their position.

Figure 5:
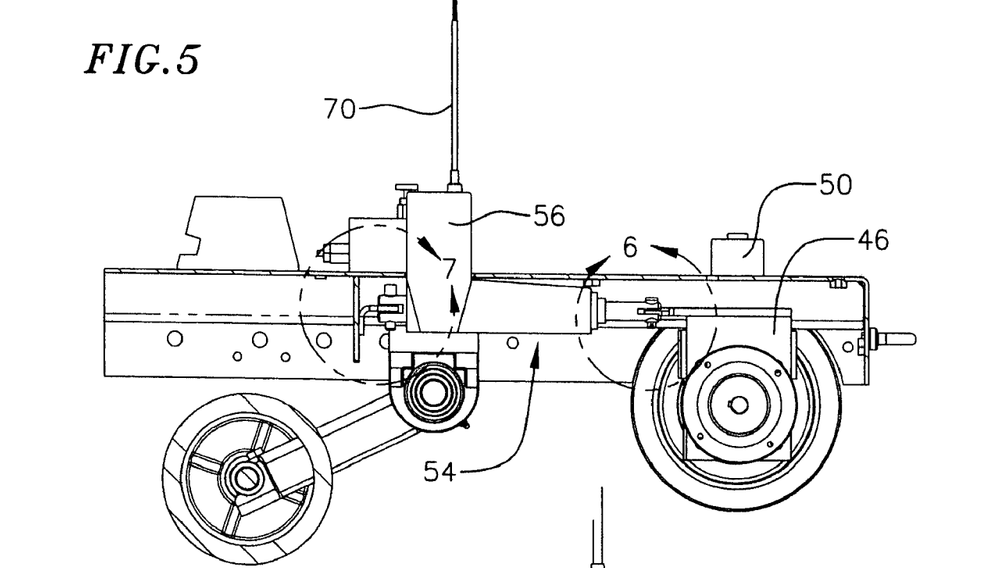
FIG. 5 is a longitudinal cross-section of a portion of the saw of FIG. 3 taken along line 5-5 of FIG. 3.
Figure 5A:
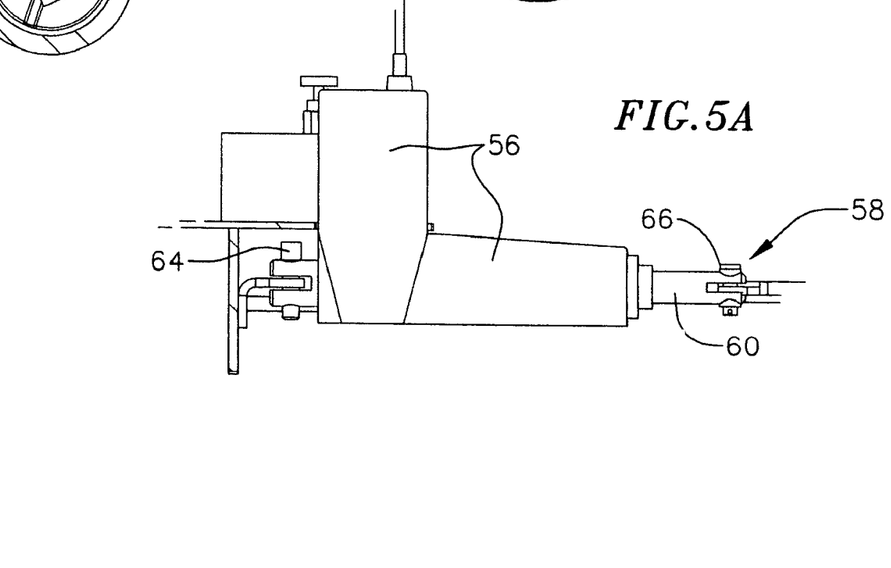
FIG. 5A is a detailed view of a movement assembly for moving the drive assembly of the saw of FIG. 1.

The linear actuator 56 and the position of the rod 60 are preferably controlled through a control signal or current provided through cable 70 (FIGS. 4-5). The cable 70 extends within the cowl to the operator's console 17 to a suitable control 16 on the console.

The control 16 can take a number of configurations and preferably allows the operator to easily control the movement of the drive assembly. In the examples described, the control 16 can move the rod 60 of the linear actuator 56 relatively small amounts over a wide range to move the drive assembly, such as by moving the axle through a desired angle. The control 16 can operate through a number of electrical, mechanical or electro-mechanical devices for controlling the linear actuator. For example, the control 16 may be a switch that is open until pressed or actuated and which continues to send a retract or extend signal or current to the linear actuator until the switch is released, and the actuator continues to move the axle as long as the switch is actuated. In another example, the control 16 may be used to send a single movement signal to the linear actuator for each time the control is actuated, and the range of motion of the rod 60 may be determined by settings incorporated either in the control 16 or in the linear actuator. In a further example, the control 16 may be used to provide a pre-determined signal or current to the actuator as a function of the position of the control 16. The position of the control 16 would then determine the amount that the drive assembly is moved, or the control 16 could be calibrated so that the position of the control 16 determines the position of the drive assembly relative to the frame.

In one example, the control 16 is a toggle switch 72 (FIG. 11) that is moved to the right to move the saw to the right, and is moved to the left to move the saw to the left. The toggle switch is held the desired amount of time to achieve the desired movement of the drive assembly and then released. Other configurations of a control 16 and of a toggle switch 72 to achieve the desired movement of the drive assembly can be used.

A saw blade mounted on the left side of the saw for left-hand saw cutting is shown in FIG. 8. The operator intends to keep the saw cutting along the cut line 18 by keeping the saw in the direction of travel indicated by the arrow 74. As a result of the blade resistance force represented by the arrow 76, the saw tends to move to the left when the axle is exactly transverse to the frame, as shown in FIG. 3. Therefore, the operator can actuate the toggle switch 72, by moving the switch to the right, which causes the linear actuator 56 to retract the rod 60 and pivot the axle 46 to the desired angle shown in FIG. 8 relative to the frame. As a result, the drive assembly produces a motive or propel force 78 to counter the effects of the blade resistance force 76 so that the saw continues in the direction of travel 74. As noted above, other means can be used to change the angle of the axle relative to the frame, to achieve the desired result of maintaining the saw movement in the direction of travel.

A saw blade mounted on the right side of the saw for right-hand saw cutting is shown in FIG. 9. The operator intends to keep the saw cutting along the cut line 18 by keeping the saw in the direction of travel indicated by the arrow 74. As a result of the blade resistance force represented by the arrow 76A, the saw tends to move to the right when the axle is exactly transverse to the frame, as shown in FIG. 3. Therefore, the operator can actuate the toggle switch 72, by moving the switch to the left, which causes the linear actuator 56 to extend the rod 60 and pivot the axle 46 to the desired angle 80 shown in FIG. 9 relative to the frame. As shown in FIG. 9, and similarly with the axle angle depicted in FIG. 8, the angle is shown as being relative to the rear edge of the frame. However, any convenient reference may be used, for example the center line 42. As a result, the drive assembly produces a motive or propel force 78A to counter the effects of the blade resistance force 76A so that the saw continues in the direction of travel 74.

Figure 10:
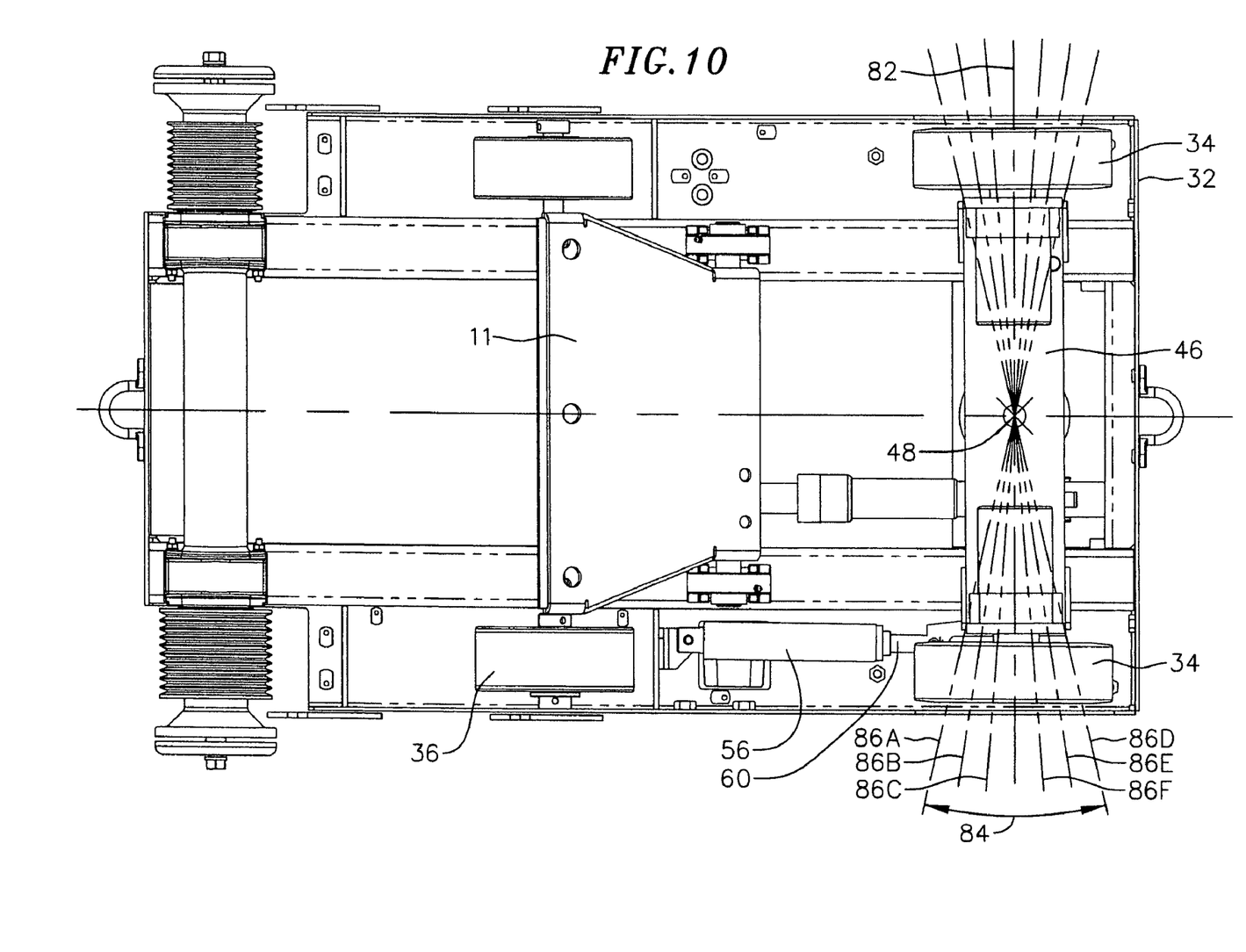
FIG. 10 is a bottom plan view of the saw similar to that of FIG. 3 showing examples of a range of motion for pivoting of the movable drive assembly.

The exactly transverse position of the axle 46 relative to the frame 32 is depicted in FIG. 10 by the line 82. In this configuration of the axle, the linear actuator 56 has its rod 60 at an approximately intermediate position in its range of motion. The range of motion of the rod 60 in the linear actuator may be comparable to the range of motion over which the axle can pivot. An example of a possible range of motion of the axle is depicted in FIG. 10 and may be represented by the arc 84. The desired range of motion for the axle can be determined through experimentation. While it is not shown, the movement of the rod 60 as a function of time that the toggle switch 72 is actuated may be depicted graphically, and the distance versus time function for a given actuator can be selected by the designer to produce the desired result. The actuator or other moving element is selected so as to preferably resist the forces developed in the axle during operation and maintain the position of the axle at the selected angle, for example in spite of vibration or counter forces that may be applied to the linear actuator.

The lines 86A-86C represent examples of axle angles at which the axle can be placed for moving the saw right, as depicted in FIG. 8. However, it should be understood that the lines 86A-86C represent individual axle positions, but that the axle can be moved to a position at any desired location within the range of motion. Conversely, if a designer wants to limit axle positions to discrete angles, the movable drive assembly and/or the moving element can be configured accordingly. Likewise, the lines 86D-86F represent examples of axle angles at which the axle can be placed for moving the saw left, as depicted in FIG. 9. However, the axle can be moved to a position at any desired location within the range of motion for moving the saw left.

In another example of a movable drive assembly, the drive wheels 34 can have their drive directions adjusted either individually or simultaneously. In another example of a movable drive assembly 88 (FIGS. 12-13), the drive directions of the drive wheels 34 are adjusted simultaneously, even though the drive wheels are not on a common axle. In this example, the drive wheels substantially maintain their front-to-back position relative to the saw frame, but they can pivot to change the direction of the driving force for the saw.

The left drive wheel 34 is mounted to the saw frame through a wheel mounting assembly 90 (FIG. 13) having a main mounting bracket 92. The motor 6 extends through an opening (not shown) in a vertical portion 92 of the main mounting bracket for supporting and driving the wheel 34. The main mounting bracket 92 also includes a flange portion 94 extending substantially horizontally outward from an upper portion of the vertical portion 92. The flange portion 94 mounts to an underside of the saw frame through an appropriate fastener assembly 96 in a way to allow the drive wheel 34 to pivot relative to the frame. A bearing pad or other construction 98 helps to provide smooth pivoting of the drive wheel relative to the frame.

The left drive wheel is preferably mounted to the frame so that pivoting of the left drive wheel does not move that portion of the wheel tread contacting the ground substantially forward or backward relative to the saw frame. Preferably, the front-to-back position of the drive wheel stays substantially the same over the range of pivoting motion for the drive wheel. In the example shown in FIG. 13, the fastener assembly 96 has a central axis that intersects the center axis of the wheel, and is also centered between the inside and the outside of the wheel. In this configuration, pivoting of the wheel about the axis of the fastener assembly 96 keeps the tread of the wheel contacting the ground without the wheel axis moving forward or backward relative to the saw.

Figure 12:
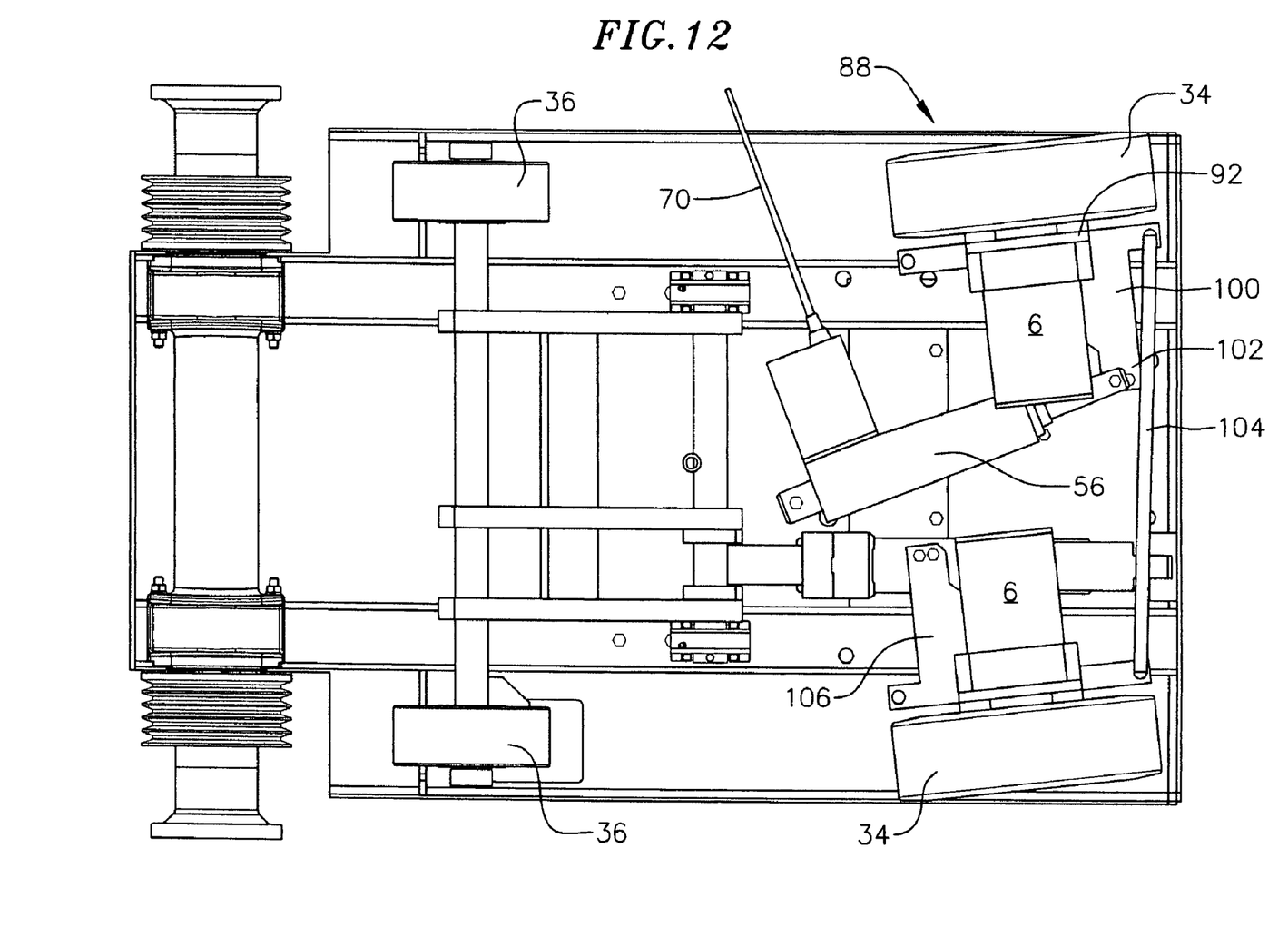
FIG. 12 is a bottom plan view of another example of a movable drive assembly for a saw.
Figure 13:
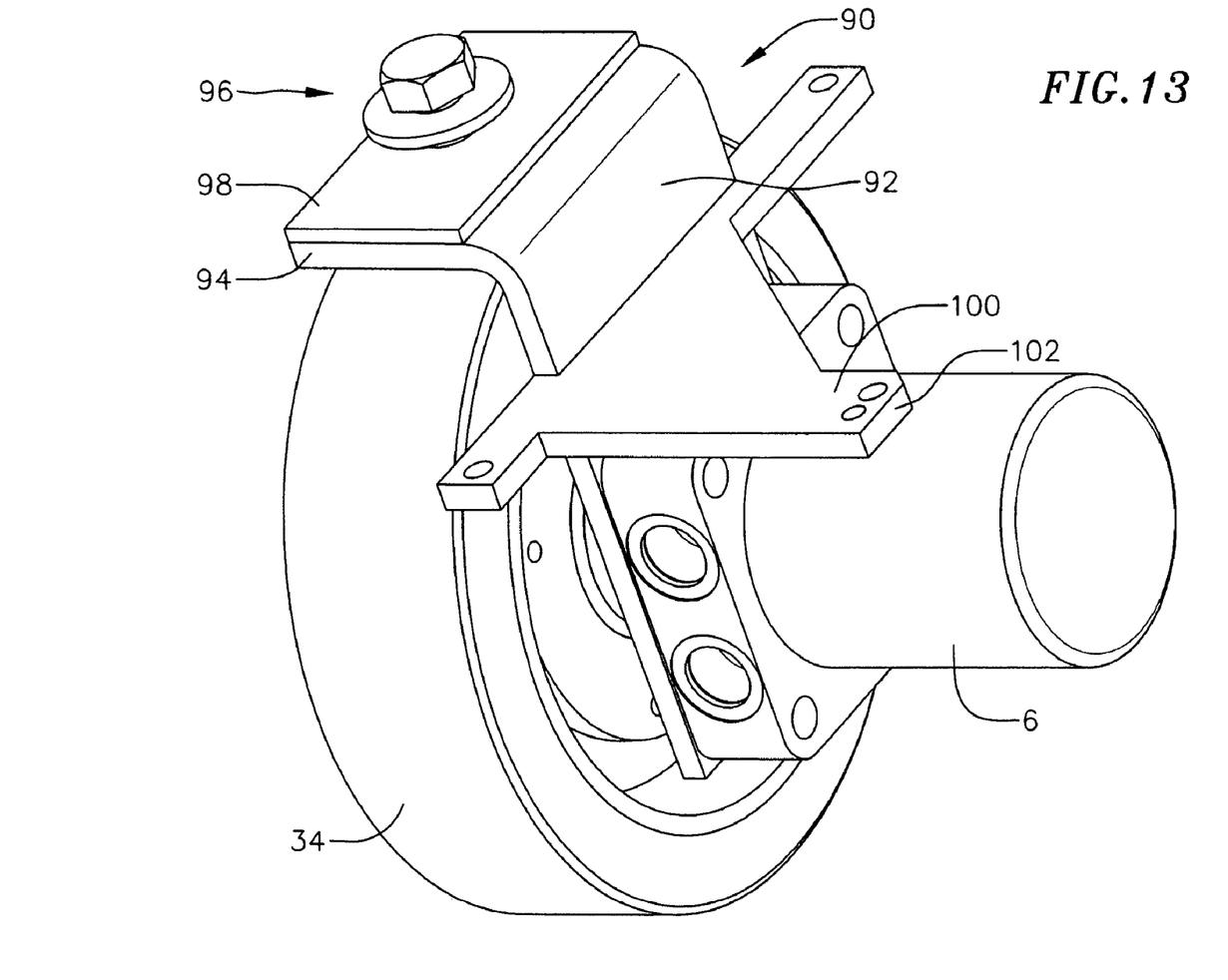
FIG. 13 is an upper isometric view of a drive assembly for the saw represented in FIG. 12.

The main mounting bracket 92 includes a drive plate 100 extending substantially perpendicular to the main mounting bracket 92. The drive plate 100 moves the drive assembly under the influence of a drive element such as the linear actuator 56 described herein. As shown in FIG. 12, the linear actuator 56 can be coupled to a link portion 102 on the drive plate for moving the drive wheel under the influence of the linear actuator. The linear actuator can be mounted in the frame in an appropriate position for achieving the desired range of motion for moving the drive wheels.

The right drive wheel 34 is also mounted to the frame in a similar manner using a mounting bracket having a similar configuration. In the configuration shown in FIG. 12, the assembly includes a tie rod 104 coupling the drive plate 100 on the left assembly to a drive plate 106 on the right assembly. In this configuration, the linear actuator moves both drive wheels at the same time by moving the left drive wheel, and then the tie rod 104 moves the right drive wheel, preferably in unison.

In another configuration, the left and right drive wheels can be independently controlled through respective linear actuators mounted to the desired locations on the respective drive plates. In such a configuration, the drive wheels can be pivoted together, or independently, through independent and/or parallel operation of the respective linear actuators.

The movable drive assembly and the moving element of the examples described herein can be used to more easily adjust an axle, particularly a rear drive axle, and more easily adjust for a variety of operating conditions. Adjustments can be made before or during operation of the saw, and without the use of tools. Additionally, the need for the operator to manually adjust the saw position through the handle bars 15 can be reduced or eliminated.

Having thus described several exemplary implementations of the invention, it will be apparent that various alterations and modifications can be made without departing from the inventions or the concepts discussed herein. Such operations and modifications, though not expressly described above, are nonetheless intended and implied to be within the spirit and scope of the inventions. Accordingly, the foregoing description is intended to be illustrative only.

What is claimed is:

1. A concrete saw comprising a frame and a motor on the frame, a cutting blade drive shaft supported on the frame and driven by the motor wherein a cutting blade can be positioned at a front of the saw, first and second front wheels under the motor supporting the frame on a surface to be cut by a cutting blade and configured to raise and lower the front of the saw and a cutting blade relative to the surface, at least one handle supported on the frame at a rear portion of the frame and extending rearward of the frame, a drive assembly for moving the saw in a direction and having first and second powered drive wheels behind the first and second front wheels and rearward of the motor and supporting the frame on the surface, and a powered moving element configured to move the drive assembly about an axis substantially perpendicular to the surface and relative to the frame and to fix the drive assembly in place after being moved by the moving element.

2. The concrete saw of claim 1 wherein the first and second powered drive wheels are on a pivoting support.

3. The concrete saw of claim 1 wherein the powered moving element is a linear actuator.

4. A concrete saw comprising a frame having a front-to-back center line, a motor supported by the frame, a concrete saw blade supported by the frame and driven by the motor wherein the saw blade is positioned away from the center line, at least one powered drive wheel coupled to the frame for supporting the frame on a concrete surface such that the at least one powered drive wheel moves the saw by rotating about a wheel axis extending in a first direction over the concrete surface, and powered moving means for moving the at least one powered drive wheel relative to the frame so that the at least one powered drive wheel rotates with the wheel axis extending in a different direction over the concrete surface without having to loosen any fasteners and for maintaining the at least one powered drive wheel at a new position.

5. The saw of claim 4 wherein the at least one powered drive wheel is supported on an axle and the powered moving means is coupled to the axle.

6. The saw of claim 5 wherein the at least one powered drive wheel includes first and second drive powered wheels mounted to the axle.

7. A concrete saw comprising a frame having a front-to-back center line, a motor supported by the frame, a concrete saw blade supported by the frame and driven by the motor wherein the saw blade is positioned away from the center line, at least one powered drive wheel coupled to the frame for supporting the frame on a concrete surface such that the at least one powered drive wheel moves the saw, and powered moving means for moving the at least one powered drive wheel relative to the frame without having to loosen any fasteners and for maintaining the at least one powered drive wheel at a new position, wherein the at least one powered drive wheel is supported on an axle and the powered moving means is coupled to the axle, wherein the at least one powered drive wheel includes first and second drive wheels mounted to the axle, and wherein the frame is supported on the axle through a single pivot point.

8. The saw of claim 7 wherein the frame is supported on the axle through a pin and bearings.

9. The saw of claim 7 wherein the pivot point is substantially centered between spaced apart sides of the frame.

10. The saw of claim 7 wherein the saw has a center of mass and wherein the pivot point is substantially centered from side to side relative to the center of mass of the saw.

11. The saw of claim 7 wherein the first and second powered drive wheels include respective drive motors.

12. A concrete saw comprising a frame having a front-to-back center line, a motor supported by the frame, a concrete saw blade supported by the frame and driven by the motor wherein the saw blade is positioned away from the center line, at least one powered drive wheel having a wheel axis and the at least one powered drive wheel is coupled to the frame for supporting the frame on a concrete surface such that the at least one powered drive wheel moves the saw, and powered moving means for moving the at least one drive wheel axis through an angle in a plane parallel to the concrete surface without having to loosen any fasteners and wherein the powered moving means includes a linear actuator and wherein the linear actuator is configured to fix the at least one powered drive wheel in place after being moved by the powered moving means.

13. The saw of claim 12 wherein the at least one powered drive wheel is coupled to an axle and wherein the linear actuator is coupled to the axle.

14. The saw of claim 13 wherein the at least one powered drive wheel includes first and second powered drive wheels coupled to the axle.

15. The saw of claim 14 wherein the saw blade and one of the powered drive wheels are on the same side of the saw.

16. A concrete saw comprising a frame supporting a motor and a concrete saw blade, the concrete saw blade being driven by the motor, first and second front wheels behind the saw blade supporting the frame on a surface to be cut by the saw blade and positioned so that the motor extends forward and rearward of the front wheels, first and second powered drive wheels behind the front wheels and rearward of the motor supporting the frame on the surface such that the drive wheels move the saw, handles extending rearward of the motor and of the drive wheels, and a linear actuator configured to move the drive wheels relative to the frame and within a plane parallel to the surface and to fix the drive wheels in their new position in the plane after being moved by the linear actuator from a different position in the plane.

17. The concrete saw of claim 16 wherein the first and second drive wheels support an axle.

18. The concrete saw of claim 17 wherein the axle includes first and second ends and wherein the linear actuator is coupled to one of the first and second ends.

19. The concrete saw of claim 16 further including a manually-operated switch for controlling the linear actuator.

20. The concrete saw of claim 16 wherein the frame is supported on the axle at a point other than the center of the axle.

21. A concrete saw comprising a frame supporting a motor and a concrete saw blade, the concrete saw blade being driven by the motor, first and second front wheels behind the saw blade supporting the frame on a surface to be cut by the saw blade and positioned so that the motor extends forward and rearward of the front wheels, first and second powered drive wheels behind the front wheels and rearward of the motor supporting the frame on the surface such that the drive wheels move the saw, handles extending rearward of the motor and of the drive wheels, and a linear actuator configured to move the drive wheels relative to the frame and to fix the drive wheels in their new position after being moved by the linear actuator, wherein the first and second drive wheels support an axle, and wherein the frame is supported on the axle at a center point of the axle.

22. The concrete saw of claim 21 wherein the axle includes a spindle supporting the frame.

23. A saw comprising a frame supporting a motor and supporting a blade support shaft forward of the motor wherein the blade support shaft is configured to support a blade off center relative to a center of the saw, at least one handle rearward of the motor, front wheels behind the blade support shaft, positioned under the motor such that the motor extends forward and rearward of the front wheels and supporting the frame on a surface wherein the wheels are configured to support the saw so that the wheels roll in a first direction, first and second drive wheels positioned rearward of the motor and configured to be movable relative to the frame so that the drive wheels roll in a second direction different from the first direction and further including a powered actuator configured to move the drive wheels relative to the frame and to fix the drive wheels in their new position after being moved by the powered actuator.

24. The saw of claim 23 wherein the first drive wheel and the second drive wheel are supported by an axle so that the first and second drive wheels can be configured to be movable in the second direction.

25. The saw of claim 24 wherein the powered actuator is a linear actuator linked to the axle.

26. The saw of claim 23 wherein the second drive wheel is movable relative to the frame so that the second drive wheel rolls in a second direction different from the first direction, and wherein the first and second drive wheels are linked so that the first and second drive wheels can roll in the second direction together.

27. The saw of claim 26 wherein the second drive wheel is pivotable about a substantially vertical axis.

28. The saw of claim 26 wherein the first and second drive wheels rotate about a wheel axis and wherein the first and second drive wheels pivot about a pivot axis that substantially intersects the wheel axis.

29. The saw of claim 28 wherein the pivot axis is substantially vertical.

30. The saw of claim 28 wherein each of the first and second drive wheels includes a tread width and wherein each of the first and second drive wheels include a pivot axis and each pivot axis is substantially centered on the respective tread width.

31. The saw of claim 26 further including a tie rod linking the first and second wheels.

32. The saw of claim 26 wherein the first and second drive wheels are mounted to an axle pivotable relative to the frame.

33. The saw of claim 26 wherein the first and second drive wheels pivot about respective substantially vertical axes.

34. The saw of claim 26 wherein the first and second drive wheels have respective front-to-back positions relative to the frame and wherein the front-to-back positions of each of the first and second drive wheels remain substantially constant when the first and second drive wheels are movable in the first direction and when they are movable in the second direction.

35. The saw of claim 26 wherein the first and second drive wheels are substantially aligned with an axis transverse with respect to the saw when the first and second drive wheels are movable in the first direction and when they are movable in the second direction.

36. A method for adjusting the movement of a saw comprising:
running a saw blade on the saw, followed by lowering the saw to place the rotating blade into cutting contact with a surface to be cut so that a substantial portion of a weight of the saw is bearing on the blade while the blade is cutting;
moving the saw in a first direction so that the saw blade can follow a cutting line and so that first and second drive wheels positioned behind first and second front wheels and to a first side of the saw blade can move in a first direction;
moving with a powered actuator the first and second drive wheels to respective second positions so that the first and second drive wheels move in a second direction different than the first direction; and
fixing with the powered actuator the first and second drive wheels in the second positions.

37. The method of claim 36 further including moving the first and second drive wheels while the saw is moving.

38. The method of claim 36 wherein moving the first and second wheels includes moving the first and second drive wheels simultaneously.

39. The method of claim 36 wherein moving the first and second drive wheels includes moving the first and second drive wheels separately.

40. The method of claim 36 wherein moving the first and second drive wheels includes moving the first and second drive wheels using a linear actuator.

41. The method of claim 36 wherein the first and second drive wheels are on an axle and wherein moving the first and second drive wheels includes moving the axle.

42. The method of claim 36 wherein the first drive wheel is pivotable about a vertical axis substantially centered on the first drive wheel.

43. The method of claim 42 wherein the second drive wheel is pivotable about a vertical axis substantially centered on the second drive wheel.

44. The method of claim 36 further including moving the first and second drive wheels in predetermined increments.

45. A concrete saw comprising a drive assembly for moving the saw in a direction and having at least one drive element, a frame and a blade supported by the frame, a powered moving element configured for pivoting the drive assembly relative to the frame about a substantially vertical axis and for fixing the drive assembly in place when the powered moving element pivots the drive assembly, a console supported on the frame and configured to allow access to the console by an operator, and an electromechanical control on the console and configured to control the powered moving element.

46. The concrete saw of claim 45 wherein the electromechanical control is a switch.

47. The concrete saw of claim 46 wherein the switch is a toggle switch.

48. The concrete saw of claim 46 wherein the control and the moving element are configured to move the powered moving element in predetermined increments.

* * * * *